(12) United States Patent
Tsirkin

(10) Patent No.: US 11,775,328 B2
(45) Date of Patent: Oct. 3, 2023

(54) VIRTUAL BOND FOR EFFICIENT NETWORKING OF VIRTUAL MACHINES

(71) Applicant: RED HAT, INC., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 491 days.

(21) Appl. No.: 16/994,902

(22) Filed: Aug. 17, 2020

(65) Prior Publication Data

US 2022/0050700 A1 Feb. 17, 2022

(51) Int. Cl.
*G06F 9/455* (2018.01)

(52) U.S. Cl.
CPC ........... *G06F 9/45558* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 8,429,675 | B1* | 4/2013 | Radhakrishnan | G06F 9/5077 719/319 |
| 9,176,767 | B2 | 11/2015 | Cantu | |
| 9,600,309 | B2 | 3/2017 | Prawer et al. | |
| 10,198,299 | B1 | 2/2019 | Xu et al. | |
| 2017/0126726 | A1* | 5/2017 | Han | G06F 12/1009 |
| 2019/0163521 | A1 | 5/2019 | Lee et al. | |
| 2019/0379731 | A1 | 12/2019 | Johnson et al. | |

OTHER PUBLICATIONS

1. Burtsev et al. (Fido: Fast Inter-Virtual-Machine Communication for Enterprise Appliances, Jun. 2009, USENIX Annual technical conference, pp. 1-14) (Year: 2009).*
Zhai, E. et al. (Jul. 2008). "Live Migration with Pass-through Device for Linux VM", Intel Corporation, 261-267.
Xu, X, et al. (Apr. 2016). "SRVM: Hypervisor Support for Live Migration with Passthrough SR-IOV Network Devices", VMware Inc., 65-77.
Garzarella, S. et al. (May 2015) "Virtual device passthrough for high speed VM networking", University of Pisa, Italy, 99-110.

* cited by examiner

*Primary Examiner* — Lewis A Bullock, Jr.
*Assistant Examiner* — Melissa A Headly
(74) *Attorney, Agent, or Firm* — Womble Bond Dickinson (US) LLP

(57) ABSTRACT

A packet is received by a first virtual machine supported by a host system from a second virtual machine via a shared memory device that is accessible to a plurality of virtual machines supported by the host system. The first virtual machine determines that the second virtual machine is supported by the host system in view of receiving the packet via the shared memory device. Identification information associated with the second virtual machine is stored in a virtual bond data structure, wherein the identification information associated with the second virtual machine being present in the virtual bond data structure causes the first virtual machine to transmit a subsequent packet to the second virtual machine via the shared memory device.

17 Claims, 7 Drawing Sheets

VIRTUAL BOND FOR EFFICIENT NETWORKING OF VIRTUAL MACHINES

TECHNICAL FIELD

Aspects of the present disclosure relate to a virtualization system, and more particularly, to utilizing a virtual bond for efficient networking of virtual machines.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
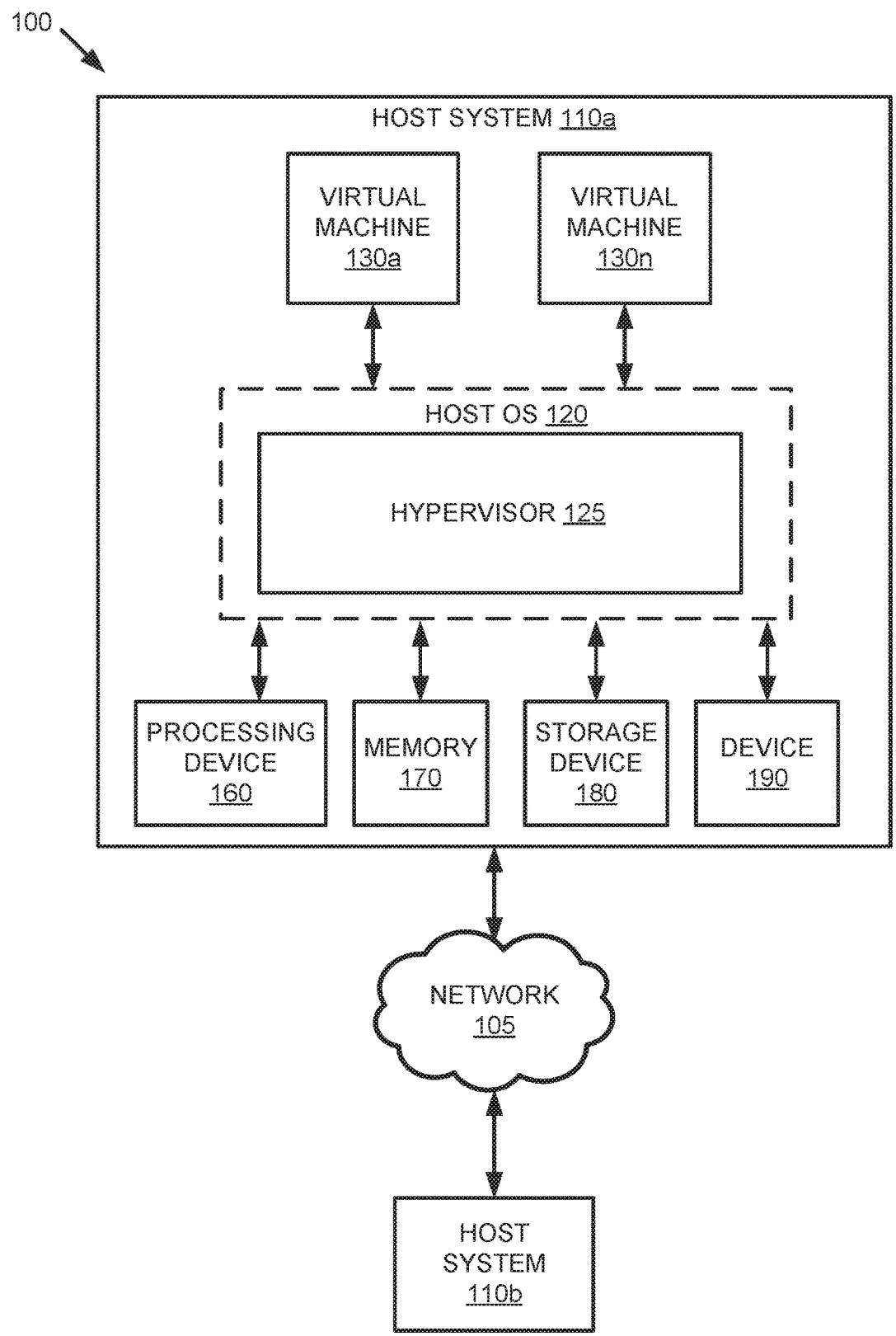
FIG. 1 is a block diagram that illustrates an example computer architecture, in accordance with some embodiments.

In embodiments, a virtualization system may include one or more host systems that each support one or more virtual machines (VMs). The VMs may be connected to one another via a network that is used to transmit network packets (also referred to as "packets" hereafter) between the VMs of the virtualization system.

In a conventional virtualization system, a network device pass through (also referred to as "pass through device" hereafter) is utilized for connecting VMs via a network of the virtualization system. Packets are provided from a source VM to a network device, such as a network interface card (NIC), having a pass through. The network device identifies a destination address for the packet and provides the packet to the destination VM at the destination address via the network. Utilizing the network device pass through enables packets to be transmitted between VMs regardless of whether or not the VMs are supported by the same host system. In the conventional virtualization system, when two VMs are supported by different host systems, all packets between the two VMs are transmitted via the network device pass through.

However, if the two VMs (e.g., the source VM and the destination VM) are both supported by the same host system, the packet may be more efficiently transmitted from the source VM to the destination VM via a shared memory device rather than a network device pass through. The shared memory device may be a memory device of the host system that is accessible to both the source VM and the destination VM. Accordingly, a packet may be transmitted by the source VM to the shared memory device, where it can be accessed by the destination VM. In a conventional virtualization system, when two VMs are supported by the same host system, all packets between the two VMs are transmitted via the shared memory device without utilizing the network device pass through.

An issue with the above approach may arise when VMs are migrated between host systems of the virtualization system. For example, if the source VM and the destination VM are originally supported by different host systems, then all packets may be transmitted using the network device pass through. However, if the destination VM is then migrated to the same host system as the source VM, then it would be more efficient for packets to be transmitted via the shared memory device.

In another example, if the source VM and the destination VM are originally supported by the same host system, then all packets may be transmitted using the shared memory device. However, if the destination VM is then migrated to a different host system than the source VM, then the destination VM may no longer be able to communicate with the source VM via the shared memory device because the destination VM can no longer access the shared memory device of the original host system (because the destination VM is no longer supported by the original host system), which may result in packet loss between the VMs.

Aspects of the disclosure address the above-noted and other deficiencies by utilizing a virtual bond for efficient networking of VMs. A hypervisor executed by a processing device of a host system of the virtualization system may expose VMs supported by the host system to interfaces for both the shared memory device and the network device pass through. Accordingly, when a VM transmits a packet, the VM may be able to do so via the shared memory device and/or the network device pass through.

When a source VM transmits a packet to a destination VM, the source VM may transmit the packet via both the shared memory device and the network device pass through. If the destination VM is supported by the same host system as the source VM, then the destination VM will receive the packet via both the shared memory device and the network device pass through. If the destination VM is supported by a different host system as the source VM, then the destination VM will receive the packet via the network device pass through, but will not receive the packet via the shared memory device, because the destination VM cannot access the shared memory device. Accordingly, the destination VM may determine whether or not the source VM is supported by the same host system based on whether or not the packet is received via the shared memory device.

If the destination VM receives the packet from the source VM via the shared memory device, then the destination VM may determine that the source VM is supported by the same host system. Upon the determination, the destination VM may establish a virtual bond with the source VM that indicates the two VMs are supported by the same host system. The virtual bond may cause the destination VM to transmit subsequent packets to the source VM via the shared memory device without using the network device pass through because the destination VM has determined that the VMs are supported by the same host system.

Similarly, when the source VM receives a subsequent packet from the destination VM via the shared memory device, then the source VM may also establish a virtual bond and begin transmitting subsequent packets via the shared memory device without using the network device pass through.

Having the VMs determine whether other VMs are hosted by the same host system and establishing virtual bonds based on the determination allows for more efficient communication between VMs of a virtualization system. Transmitting packets via both the shared memory device and the network device pass through allows the VMs to quickly identify other VMs that are supported by the same host system, particularly when VMs are being migrated between host systems of the virtualization system. Upon identifying the other VMs that are supported by the same host system, the VMs may begin transmitting packets via the shared memory device rather than the network device pass through, improving the performance of the virtualization system and conserving network bandwidth for other communications.

FIG. 1 depicts a high-level component diagram of an illustrative example of a computer system architecture 100, in accordance with one or more aspects of the present disclosure. One skilled in the art will appreciate that other computer system architectures 100 are possible, and that the implementation of a computer system utilizing examples of the invention are not necessarily limited to the specific architecture depicted by FIG. 1.

As shown in FIG. 1, computer system architecture 100 includes host systems 110a, b. The host systems 110a, b include one or more processing devices 160, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing device 160. It should be noted that although, for simplicity, a single processing device 160, storage device 180, and device 190 are depicted in FIG. 1, other embodiments of host systems 110a, b may include a plurality of processing devices, storage devices, and devices. The host systems 110a, b may be a server, a mainframe, a workstation, a personal computer (PC), a mobile phone, a palm-sized computing device, etc. In embodiments, host systems 110a, b may be separate computing devices. In some embodiments, host systems 110a, b may be implemented by a single computing device. For clarity, some components of host system 110b are not shown. Furthermore, although computer system architecture 100 is illustrated as having two host systems, embodiments of the disclosure may utilize any number of host systems.

Host system 110a, b may additionally include one or more virtual machines (VMs) 130 and host operating system (OS) 120. VM 130 is a software implementation of a machine that executes programs as though it was an actual physical machine. Host OS 120 manages the hardware resources of the computer system and provides functions such as inter-process communication, scheduling, memory management, and so forth.

Host OS 120 may include a hypervisor 125 (which may also be known as a virtual machine monitor (VMM)), which provides a virtual operating platform for VMs 130 and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The host systems 110a, b are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110a, b.

Figure 2:
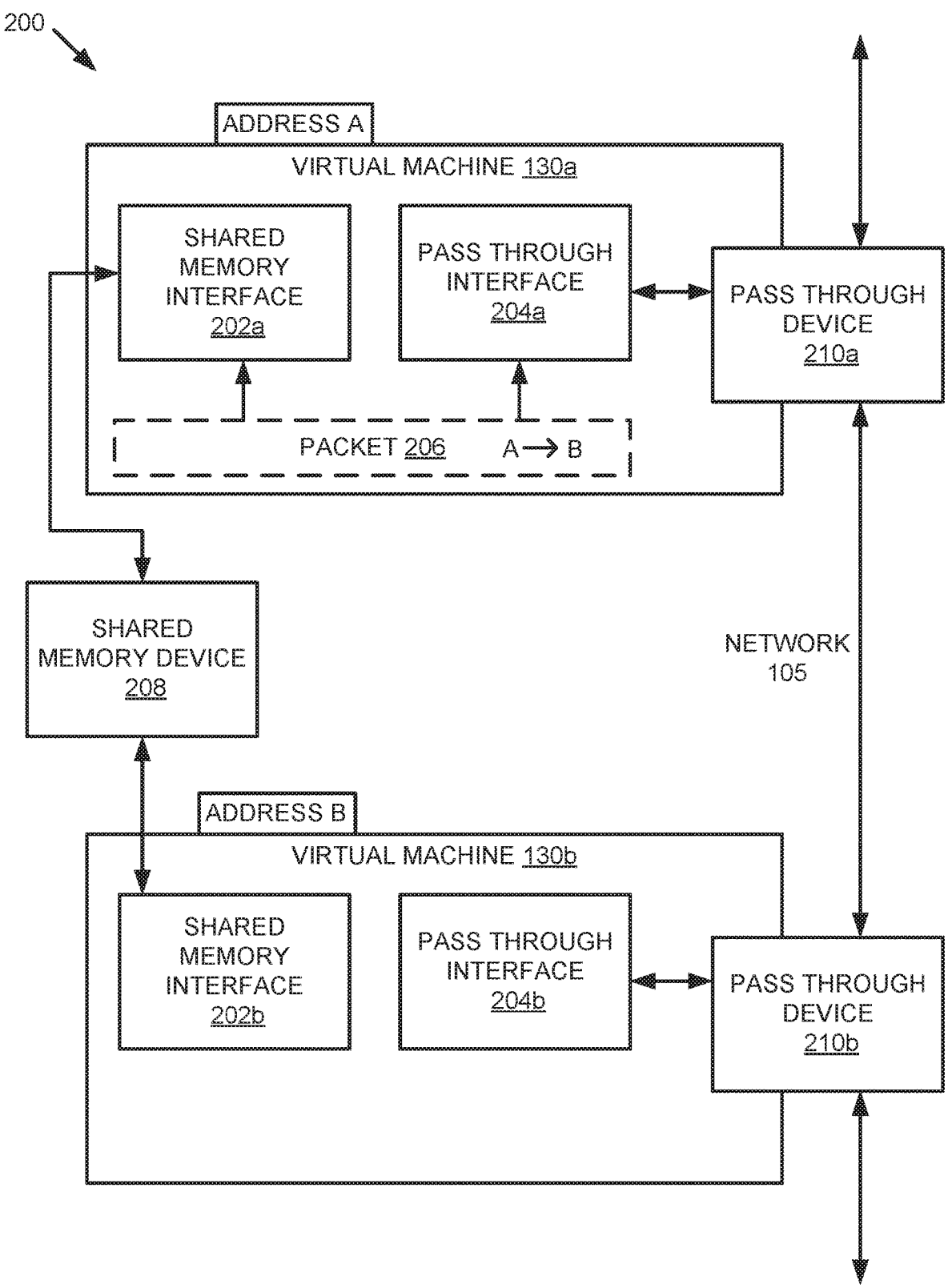
FIG. 2 is an illustration of an example of a first virtual machine transmitting a packet to a second virtual machine supported by a host system, in accordance with embodiments of the disclosure.

FIG. 2 is an illustration of an example of a first virtual machine transmitting a packet to a second virtual machine supported by a host system 200, in accordance with embodiments of the disclosure. The host system 200 includes virtual machines 130a, b, shared memory device 208, and pass through devices 210a, b. As previously described, shared memory device 208 may be a memory device (e.g., memory 170 and/or storage device 180) that is accessible by VMs supported by host system 200. Pass through devices 210a, b may be network devices (e.g., device 190) that may include network device pass through that enable communication between VMs via network 105. In some embodiments, pass through devices 210a, b may be different network devices. In embodiments, pass through devices 210a, b may be the same network device.

In embodiments, a hypervisor (e.g., hypervisor 125) may have exposed virtual machines 130a, b to respective shared memory interfaces 202a, b and pass through interfaces 204a, b. Shared memory interfaces 202a, b may serve as communication endpoints for VMs 130a, b to communicate with the shared memory device 208. Pass through interfaces 204a, b may serve as communication endpoints for VMs 130a, b to communicate via pass through devices 210a, b, respectively.

Referring to FIG. 2, virtual machine 130a may be located at Address A and virtual machine 130b may be located at Address B. In embodiments, the addresses may correspond to internet protocol (IP) addresses, media access control (MAC) addresses, or other types of network address. Virtual machine 130a may have a packet 206 that is to be transmitted from Address A to virtual machine 130b at Address B. In embodiments, the packet 206 may include a header that includes the source address (e.g., Address A) and the destination address (e.g., Address B) for the packet 206. The virtual machine 130a may provide the packet 206 to both the shared memory interface 202a and the pass through interface 204a. The packet 206 may then be transmitted to the virtual machine 130b via both the shared memory device 208 and the pass through device 210a.

Figure 3:
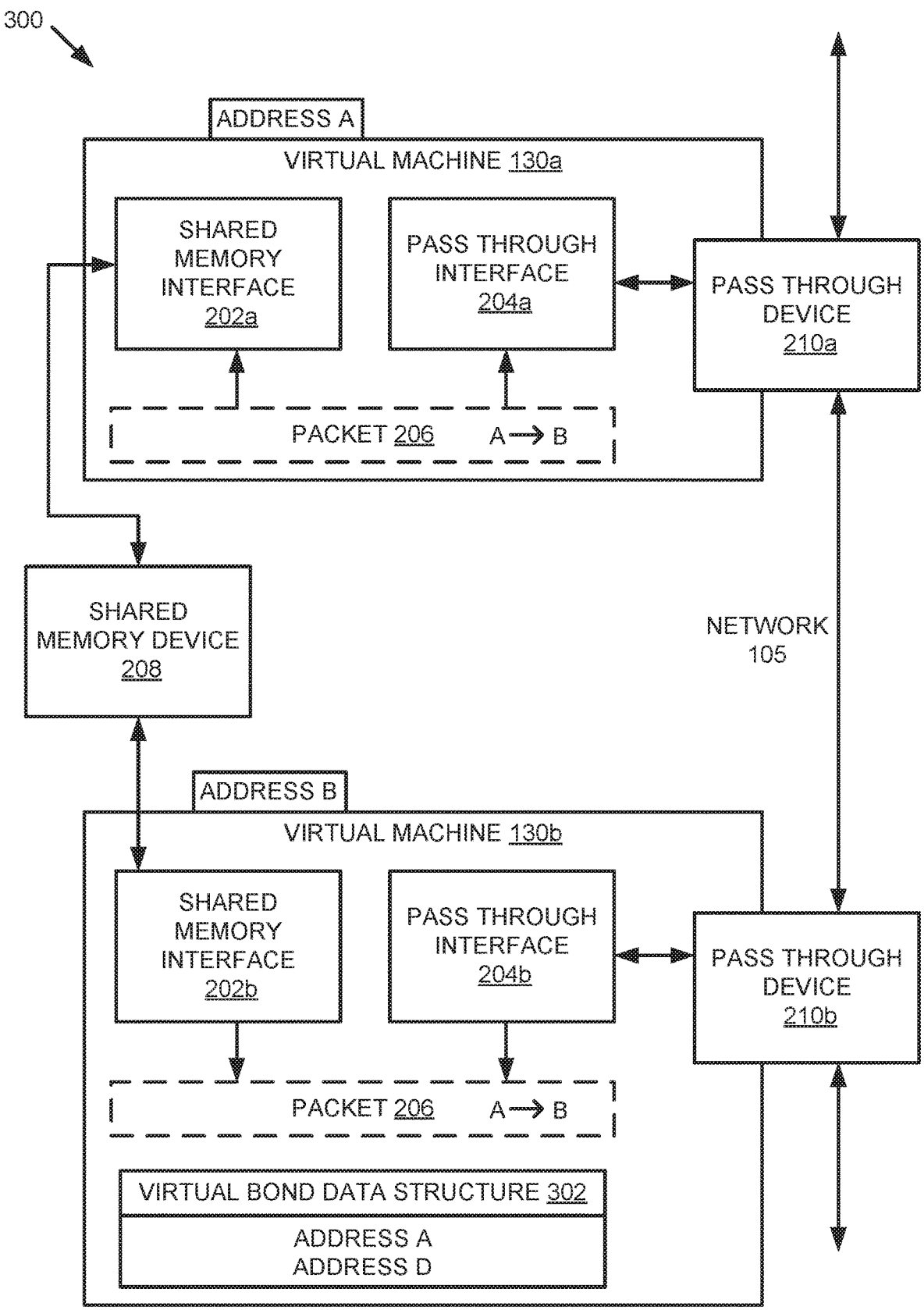
FIG. 3 is an illustration of an example of a destination virtual machine receiving a packet from a shared memory device and a pass through device of a host system, in accordance with embodiments of the disclosure.

FIG. 3 is an illustration of an example of a destination virtual machine receiving a packet from a shared memory device and a pass through device of a host system 300, in accordance with embodiments of the disclosure. In FIG. 3, virtual machine 130b has received packet 206 from both the shared memory device 208 via the shared memory interface 202b and the pass through device 210b via the pass through interface 204b. In embodiments, the virtual machine 130b may identify the source address (e.g., Address A) of packet 206. For example, the virtual machine 130b may identify the source address that is included in the header of packet 206.

Because the packet 206 was received from virtual machine 130a via the shared memory device 208, virtual machine 130b may determine that virtual machine 130a is supported by the same host system (e.g., host system 300) as virtual machine 130b. Accordingly, the virtual machine 130b may establish a virtual bond with virtual machine 130a. As previously described, the virtual bond may cause the virtual machine 130b to transmit packets to virtual machine 130a via the shared memory device 208 without transmitting the packets via the pass through device 210b and network 105. By preventing the packets from being unnecessarily transmitted using network 105, network bandwidth may be conserved for transmitting other communications.

In embodiments, the virtual machine 130b may maintain a virtual bond data structure 302 that includes a listing of virtual machines that the virtual machine 130b has established a virtual bond with. In embodiments, the virtual bond data structure 302 may include address information associated with the bonded virtual machines. For example, the virtual bond data structure 302 may include MAC addresses of virtual machines that virtual machine 130b has established virtual bonds with. Accordingly, because virtual machine 130b has established a virtual bond with virtual machine 130a, virtual machine 130b may add the address information of virtual machine 130a (e.g., Address A) to indicate that there is a virtual bond between virtual machine 130b and virtual machine 130a.

The virtual machine 130b may maintain the virtual bond data structure 302 by adding or removing virtual machines from the virtual bond data structure 302 as virtual bonds are established or destroyed. In embodiments, a virtual bond may be destroyed when a virtual machine included in the virtual bond data structure 302 is migrated to a different host system and a packet is received from the virtual machine via the pass through device, but not via the shared memory device. For example, if the virtual machine at Address D was migrated to a different host system and transmitted a packet to virtual machine 130b, the virtual machine 130b would receive the packet via pass through device 210b, but not via the shared memory device 208. Based on this, the virtual machine 130b may determine that the virtual machine at Address D is no longer supported by host system 300. Accordingly, virtual machine 130b may destroy the virtual bond for the virtual machine at Address D and remove Address D from the virtual bond data structure 302.

In embodiments, if the virtual machine 130b is migrated to a different host system, the virtual machine 130b may destroy the existing virtual bonds and remove the corresponding virtual machines and/or address information from the virtual bond data structure 302.

Figure 4:
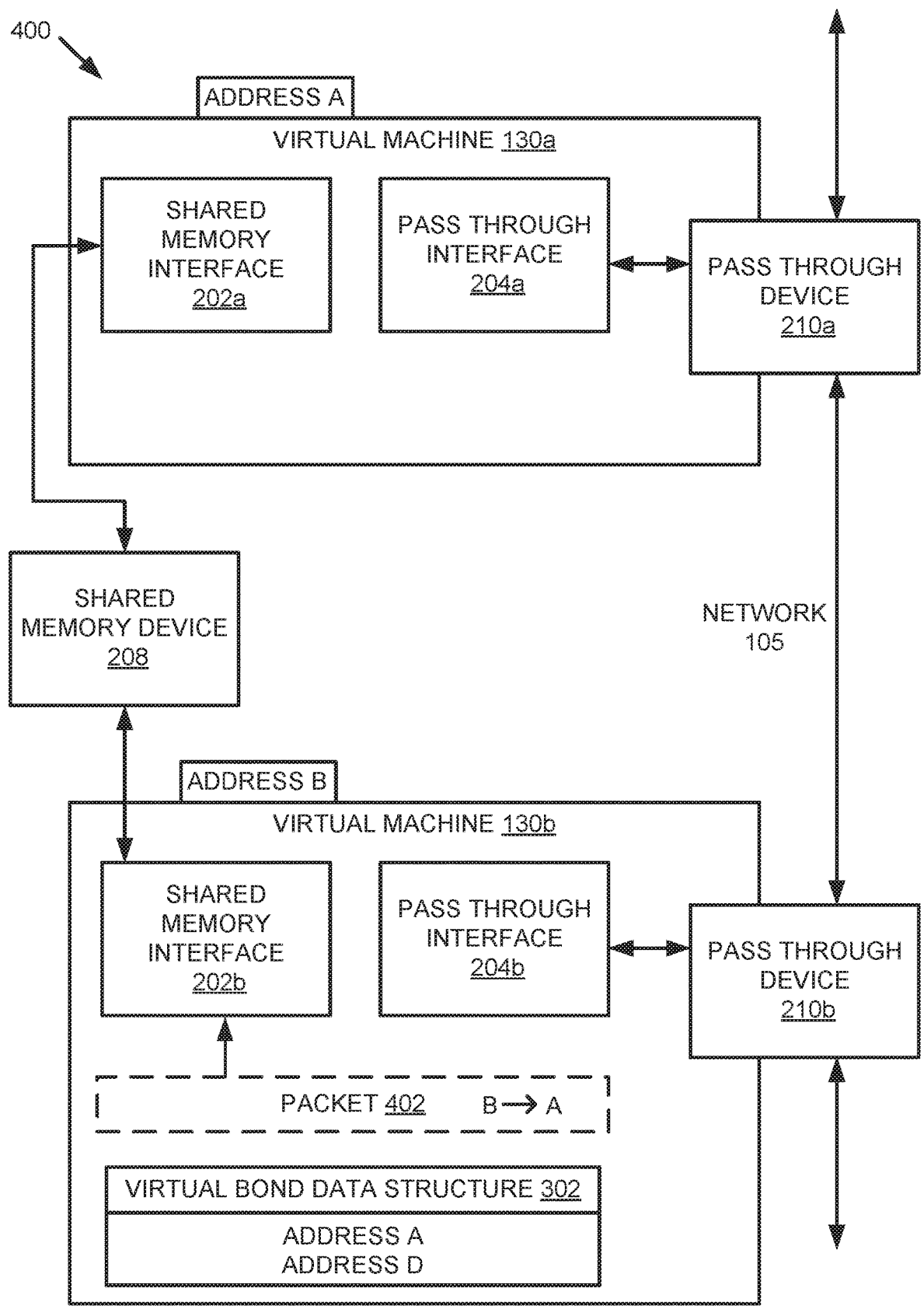
FIG. 4 is an illustration of an example of a virtual machine of a host system transmitting a packet via a shared memory device in view of an established virtual bond, in accordance with embodiments of the disclosure.

FIG. 4 is an illustration of an example of a virtual machine of a host system 400 transmitting a packet via a shared memory device in view of an established virtual bond, in accordance with embodiments of the disclosure. In FIG. 4, virtual machine 130b is to transmit a packet 402 to virtual machine 130a at Address A. Prior to transmitting the packet 402, the virtual machine 130b may query the virtual bond data structure 302 to determine if the destination address of the packet 402 (e.g., Address A) is associated with a virtual bond.

Because Address A is included in the virtual bond data structure, virtual machine 130b may provide the packet 402 to the shared memory interface 202b to transmit the packet 402 to the virtual machine 130a via the shared memory device 208 without providing the packet to the pass through interface 204b.

Figure 5:
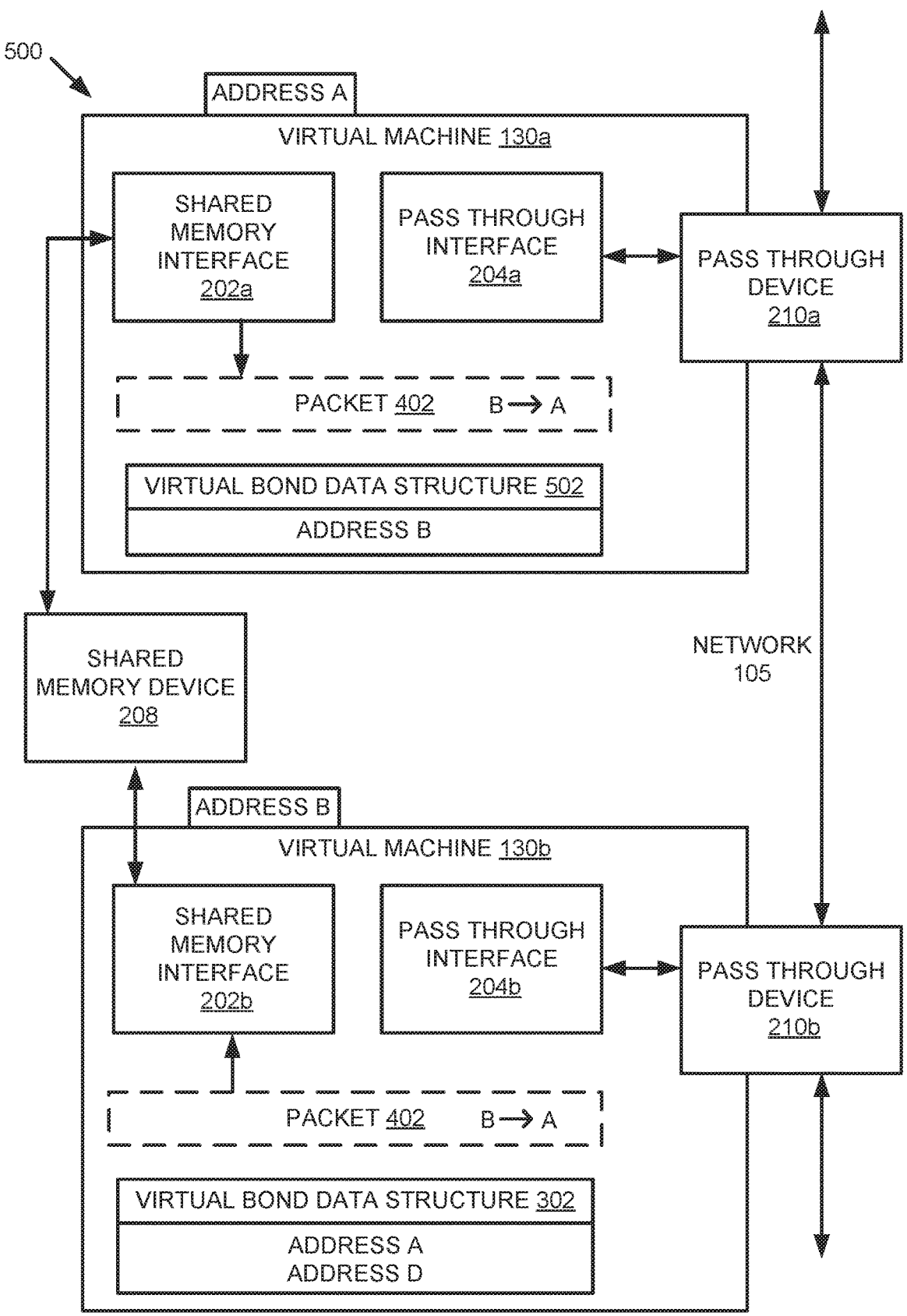
FIG. 5 is an illustration of an example of a virtual machine receiving a subsequent packet from a shared memory device of a host system, in accordance with embodiments of the disclosure.

FIG. 5 is an illustration of an example of a virtual machine receiving a subsequent packet from a shared memory device of a host system 500, in accordance with embodiments of the disclosure. In FIG. 5, virtual machine 130a has received packet 402 from the shared memory device 208 via the shared memory interface 202a. In embodiments, the virtual machine 130a may identify the source address (e.g., Address B) of packet 402.

Because the packet 402 was received from virtual machine 130b via the shared memory device 208, virtual machine 130a may determine that virtual machine 130b is supported by the same host system (e.g., host system 500) as virtual machine 130a. Accordingly, the virtual machine 130a may establish a virtual bond with virtual machine 130b. As previously described, the virtual bond may cause the virtual machine 130a to transmit packets to virtual machine 130b via the shared memory device 208 without transmitting the packets via the pass through device 210a and network 105.

In embodiments, the virtual machine 130a may maintain a virtual bond data structure 502 that includes a listing of virtual machines that the virtual machine 130a has established a virtual bond with. Accordingly, because virtual machine 130a has established a virtual bond with virtual machine 130b, virtual machine 130a may add the address information of virtual machine 130b (e.g., Address B) to indicate that there is a virtual bond between virtual machine 130a and virtual machine 130b.

Figure 6:
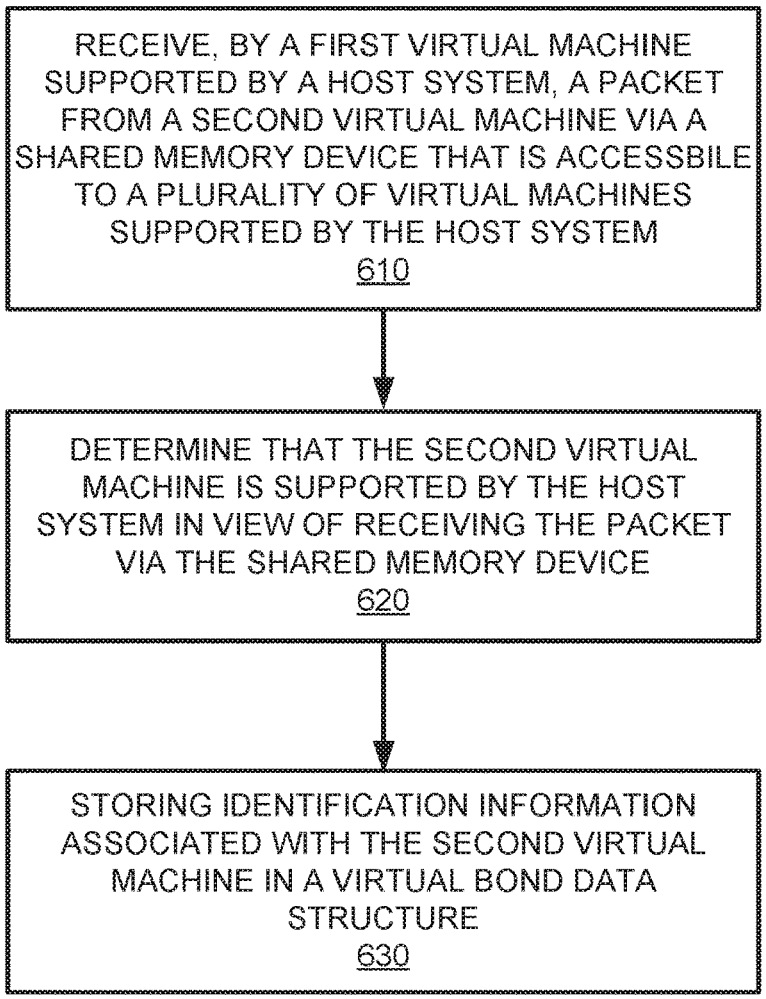
FIG. 6 is a flow diagram of a method of utilizing a virtual bond for efficient networking of virtual machines, in accordance with some embodiments.

FIG. 6 is a flow diagram of a method 600 of utilizing a virtual bond for efficient networking of virtual machines, in accordance with some embodiments. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by a processing device executing a virtual machine, such as virtual machines 130*a-n* of FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 610, where the processing logic receives, by a first virtual machine supported by a host system, a packet from a second virtual machine via a shared memory device that is accessible to a plurality of virtual machines supported by the host system.

At block 620, the processing logic determines that the second virtual machine is supported by the host system in view of receiving the packet via the shared memory device.

At block 630, the processing logic stores identification information associated with the second virtual machine in a virtual bond data structure. As previously described, the identification information associated with the second virtual machine being present in the virtual bond data structure causes the first virtual machine to transmit a subsequent packet to the second virtual machine via the shared memory device.

Figure 7:
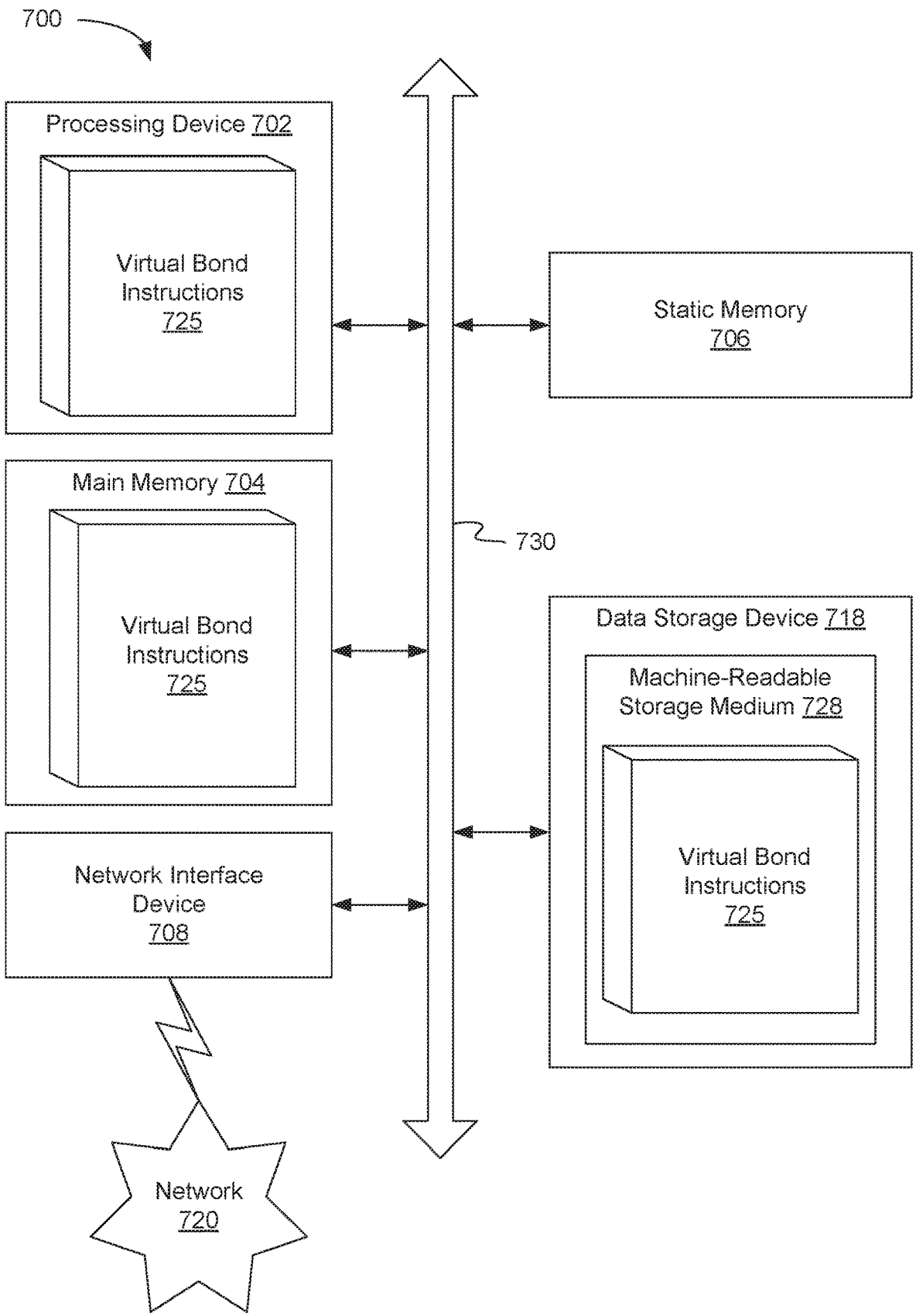
FIG. 7 is a block diagram of an example apparatus that may perform one or more of the operations described herein, in accordance with some embodiments of the present disclosure.

FIG. 7 is a block diagram of an example computing device 700 that may perform one or more of the operations described herein, in accordance with some embodiments. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations described herein, in accordance with one or more aspects of the present disclosure, for performing the operations and steps discussed herein.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions that may include virtual bond instructions 725 for carrying out the operations described herein, in accordance with one or more aspects of the present disclosure. The instructions may also reside, completely or at least partially, within main memory 704 and/or within processing device 702 during execution thereof by computing device 700, main memory 704 and processing device 702 also constituting computer-readable media. The instructions may further be transmitted or received over a network 720 via network interface device 708.

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving, by a first virtual machine supported by a host system, a packet from a second virtual machine via a shared memory device that is accessible to a plurality of virtual machines supported by the host system, wherein the packet is also received as a duplicate packet via a pass through device coupled to a network;
   determining, by a processing device executing the first virtual machine, that the second virtual machine is supported by the host system in response to receiving the packet via the shared memory device, wherein the first virtual machine maintains a first virtual bond data structure and the second virtual machine maintains a second virtual bond data structure and each of the first and second virtual bond data structures indicate a listing of virtual machines that its respective virtual machine has established a virtual bond with;
   discarding the duplicate packet in response to receiving the packet at the shared memory device;
   storing identification information of the second virtual machine in the first virtual bond data structure, wherein the identification information of the second virtual machine being present in the first virtual bond data structure causes the first virtual machine to transmit a subsequent packet to the second virtual machine via the shared memory device;
   subsequent to the storing, receiving, from the second virtual machine, a second packet via the pass through device and not via the shared memory;
   determining that the second virtual machine is no longer supported by the host system in response to receiving the packet via the pass through device but not the shared memory; and
   based on the determining that the second virtual machine is no longer supported, removing, by the first virtual machine, the identification information of the second virtual machine from the first virtual bond data structure.

2. The method of claim 1, wherein the first virtual machine and the second virtual machine are exposed to a first interface associated with the shared memory device and a second interface associated with the pass through device.

3. The method of claim 1, further comprising:
transmitting the subsequent packet to the second virtual machine via the shared memory device, wherein the second virtual machine is to store identification information associated with the first virtual machine in a second virtual bond data structure utilized by the second virtual machine.

4. The method of claim 3, wherein the identification information associated with the first virtual machine being present in the second virtual bond data structure causes the second virtual machine to transmit packets to the first virtual machine via the shared memory device.

5. The method of claim 1, wherein the identification information associated with the second virtual machine being present in the first virtual bond data structure prevents the first virtual machine from transmitting the subsequent packet to the second virtual machine via the pass through device.

6. The method of claim 1, wherein the identification information associated with the second virtual machine comprises a network address of the second virtual machine.

7. A system comprising:
a memory; and
a processing device, operatively coupled to the memory, to:
receive, by a first virtual machine supported by a host system, a packet from a second virtual machine via a shared memory device that is accessible to a plurality of virtual machines supported by the host system, wherein the packet is also received as a duplicate packet via a pass through device coupled to a network;
determine that the second virtual machine is supported by the host system in response to receiving the packet via the shared memory device, wherein the first virtual machine maintains a first virtual bond data structure and the second virtual machine maintains a second virtual bond data structure and each of the first and second virtual bond data structures indicate a listing of virtual machines that its respective virtual machine has established a virtual bond with;
discarding the duplicate packet in response to receiving the packet at the shared memory device;
store identification information of the second virtual machine in the first virtual bond data structure, wherein the identification information of the second virtual machine being present in the first virtual bond data structure causes the first virtual machine to transmit a subsequent packet to the second virtual machine via the shared memory device;
subsequent to the storing, receiving, from the second virtual machine, a second packet via the pass through device and not via the shared memory;
determining that the second virtual machine is no longer supported by the host system in response to receiving the packet via the pass through device but not the shared memory; and
based on the determining that the second virtual machine is no longer supported, removing, by the first virtual machine, the identification information associated with the second virtual machine from the first virtual bond data structure.

8. The system of claim 7, wherein the first virtual machine and the second virtual machine are exposed to a first interface associated with the shared memory device and a second interface associated with the pass through device.

9. The system of claim 7, wherein the processing device is further to:
transmit the subsequent packet to the second virtual machine via the shared memory device, wherein the second virtual machine is to store identification information associated with the first virtual machine in a second virtual bond data structure utilized by the second virtual machine.

10. The system of claim 9, wherein the identification information associated with the first virtual machine being present in the second virtual bond data structure causes the second virtual machine to transmit packets to the first virtual machine via the shared memory device.

11. The system of claim 7, wherein the identification information associated with the second virtual machine being present in the first virtual bond data structure prevents the first virtual machine from transmitting the subsequent packet to the second virtual machine via the pass through device.

12. The system of claim 7, wherein the identification information associated with the second virtual machine comprises a network address of the second virtual machine.

13. A non-transitory computer-readable storage medium including instructions that, when executed by a processing device, cause the processing device to:
receive, by a first virtual machine supported by a host system, a packet from a second virtual machine via a shared memory device that is accessible to a plurality of virtual machines supported by the host system, wherein the packet is also received as a duplicate packet via a pass through device coupled to a network;
determine, by the processing device executing the first virtual machine, that the second virtual machine is supported by the host system in response to receiving the packet via the shared memory device, wherein the first virtual machine maintains a first virtual bond data structure and the second virtual machine maintains a second virtual bond data structure and each of the first and second virtual bond data structures indicate a listing of virtual machines that its respective virtual machine has established a virtual bond with;
discarding the duplicate packet in response to receiving the packet at the shared memory device;
store identification information of the second virtual machine in the first virtual bond data structure, wherein the identification information of the second virtual machine being present in the first virtual bond data structure causes the first virtual machine to transmit a subsequent packet to the second virtual machine via the shared memory device;
subsequent to the storing, receiving, from the second virtual machine, a second packet via the pass through device and not via the shared memory;
determining, by the first virtual machine, that the second virtual machine is no longer supported by the host system in response to receiving the packet via the pass through device and not the shared memory; and
based on the determining that the second virtual machine is no longer supported, removing, by the first virtual machine, the identification information associated with the second virtual machine from the first virtual bond data structure.

14. The non-transitory computer-readable storage medium of claim 13, wherein the first virtual machine and the second virtual machine are exposed to a first interface associated with the shared memory device and a second interface associated with the pass through device.

15. The non-transitory computer-readable storage medium of claim 13, wherein the processing device is further to:
   transmit the subsequent packet to the second virtual machine via the shared memory device, wherein the second virtual machine is to store identification information associated with the first virtual machine in a second virtual bond data structure utilized by the second virtual machine.

16. The non-transitory computer-readable storage medium of claim 15, wherein the identification information associated with the first virtual machine being present in the second virtual bond data structure causes the second virtual machine to transmit packets to the first virtual machine via the shared memory device.

17. The non-transitory computer-readable storage medium of claim 13, wherein the identification information associated with the second virtual machine being present in the first virtual bond data structure prevents the first virtual machine from transmitting the subsequent packet to the second virtual machine via the pass through device.

* * * * *